United States Patent [19]

Mandle et al.

[11] 4,219,715
[45] Aug. 26, 1980

[54] MICROWAVE POWERED TURNTABLE FOR MICROWAVE OVENS

[76] Inventors: Gary B. Mandle, 508 El Camino Real #4, Burlingame, Calif. 94010; Peter D. Jurgensen, 140 Northam Ave., San Carlos, Calif. 94070

[21] Appl. No.: 927,607

[22] Filed: Jul. 24, 1978

[51] Int. Cl.² ............................................. H05B 9/06
[52] U.S. Cl. ....................... 219/10.55 F; 219/10.55 E
[58] Field of Search .................. 219/10.55 F, 10.55 R, 219/10.55 E, 10.55 M

[56] References Cited

U.S. PATENT DOCUMENTS

| 4,092,512 | 5/1978 | Suzuki et al. | 219/10.55 F |
| 4,107,502 | 8/1978 | Tanaka et al. | 219/10.55 F |
| 4,121,078 | 10/1978 | Takano et al. | 219/10.55 F |
| 4,131,778 | 12/1978 | Tanaka et al. | 219/10.55 F |

*Primary Examiner*—Arthur T. Grimley
*Attorney, Agent, or Firm*—Robert B. Block

[57] ABSTRACT

A microwave powered turntable for use in microwave ovens includes a platform for supporting food which is mounted on a base that contains an electric motor and associated drive circuitry. The drive circuitry obtains power from an antenna projecting into a waveguide formed between the platform and base.

12 Claims, 4 Drawing Figures

MICROWAVE POWERED TURNTABLE FOR MICROWAVE OVENS

TECHNICAL FIELD

This invention relates to turntables for moving articles being treated in microwave environments, and more particularly this invention relates to turntables for rotating food being heated within microwave ovens so as to uniformly cook the food.

BACKGROUND AND PRIOR ART

In order to properly cook most food, it is frequently necessary to heat the food uniformly. When cooking a dish in microwave ovens, the ovens frequently overcook some portion of the dish while undercooking other portions due to non-uniform energy distribution.

When cooking with microwave ovens, food is placed in a microwave cavity in which microwaves injected into the cavity rebound from the walls of the cavity. This causes cold spots where the microwaves cancel one another and hot spots where the microwaves reenforce one another. The location of the hot and cold spots differs between ovens. Furthermore, the location of the hot and cold spots changes with the nature of objects placed within microwave ovens so the change in the type of food placed in the ovens or the container holding the food will shift the hot and cold spots. Even if the person doing the cooking knows where hot spots are for a given portion of food within a given dish or container, this knowledge will not necessarily help once the food or container are changed. In order to cook food in a microwave oven one must absorb microwaves reflecting within the oven and therefore different foods having different dimensions will absorb some microwaves and not others.

Because of the aforementioned difficulties, commercially available microwave ovens usually have instructions suggesting that the food be turned at certain intervals. In order to avoid the inconvenience of manually turning food, some microwave ovens are currently available with built-in turntables to slowly rotate the food being cooked. However, there are numerous microwave ovens already being used which do not have turntables and many microwave ovens currently being manufactured which do not have turntables. Consequently, there is a great need for turntables which can be purchased as accessories so as to increase the usefulness of those microwave ovens already in existence and those now being manufactured which do not have built-in turntables.

In order to operate a turntable within a microwave oven, power must be delivered conveniently and safely to the turntable. According to prior art practices, this can be accomplished by a drive shaft which extends through a wall of the oven or perhaps by wires which extend through a wall of the oven. Retrofitting microwave ovens with drive shafts or wires for turntables is not advisable since microwaves could quite possibly leak through the openings for the drive shafts or wires and endanger people near the ovens. Consequently, there is a need for a self-contained power source which can fit into a microwave oven in order to drive a turntable within the oven without having to connect that turntable in some manner to an outside power supply.

OBJECTS OF THE INVENTION

In view of the aforementioned shortcomings of the prior art, it is an object of the instant invention to provide a new and improved turntable accessory for microwave ovens.

It is a further object of the instant invention to provide a new and improved turntable accessory which is especially suitable for microwave ovens wherein the turntable has a configuration which is suitable for most microwave ovens already in existence or being manufactured which are not integrally equipped with turntables.

It is still another object of the instant invention to provide a new and improved turntable for microwave ovens which is powered by microwave energy existing within the cooking cavity of the oven itself so as to avoid having to breach the wall of the oven to bring in power through shafts or wires.

It is a further object of the instant invention to provide a new and improved apparatus for moving articles in a microwave environment.

It is a further object of the instant invention to provide a new and improved turntable for microwave ovens which is safe to use and economical to both purchase and operate.

SUMMARY OF THE INVENTION

In view of the foregoing objects, and other objects, the instant invention contemplates a turntable for an enclosure having a microwave environment wherein microwave energy within the environment is used to move articles being treated by the environment. The instant invention further contemplates utilization of the microwaves existing within a microwave oven to rotate a turntable within the oven in order to uniformly cook food.

DETAILED DESCRIPTION OF THE PREFERRED EMBODIMENT

Figure 1:
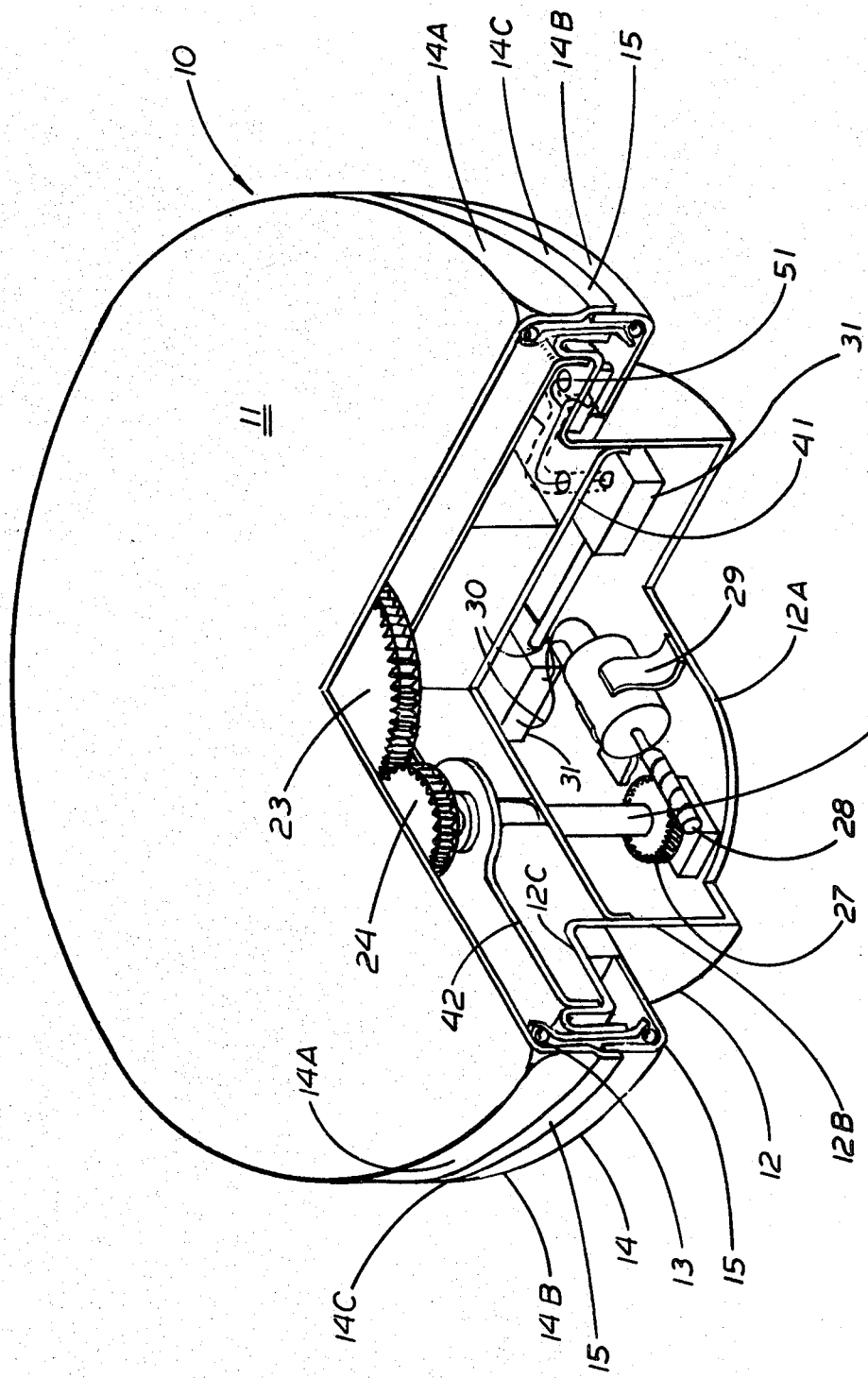
FIG. 1 is a perspective view partly cut-away showing a turntable in accordance with the principles of the instant invention; crosshatching being omitted for the sake of clarity.
Figure 2:
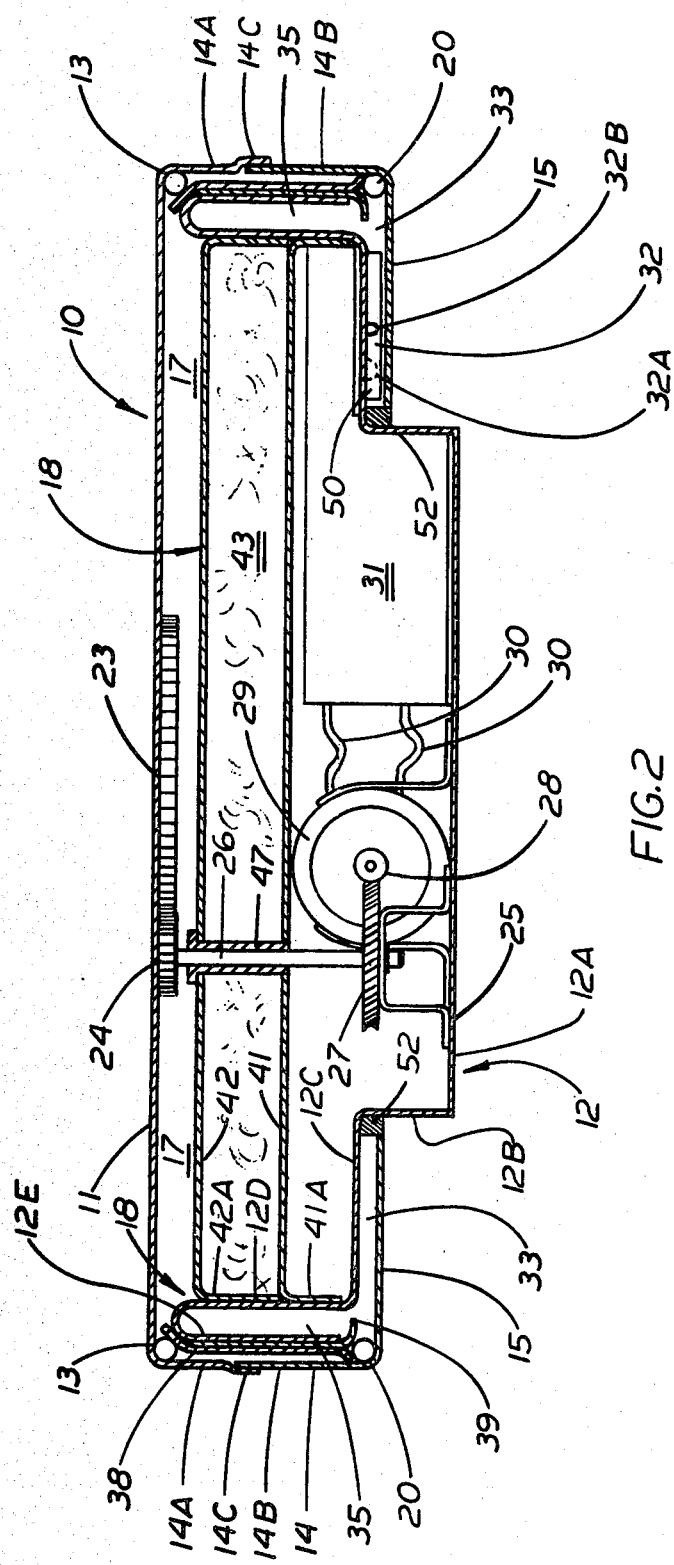
FIG. 2 is a side elevation in cross section taken along lines 2—2 of FIG. 1.

Referring now to FIGS. 1 and 2 there is shown a preferred embodiment of a turntable 10 constructed in accordance with the principles of the instant invention for use particularly within microwave ovens. The turntable 10 includes a platform portion 11 which is rotatably mounted on a base portion 12. The platform 11 is peripherially supported by a ring of ball bearings 13 disposed between the platform 11 and the base 12. The ball bearings 13 are made of an insulating or dielectric material such as polytetrafluoroethylene (Teflon, Trademark) or polypropylene.

The platform 11 has a depending skirt 14 with an underlying annular flange 15 which defines a cavity 17 in which relatively wide structure 18 rigidly associated with the base 12 is received. A second set of ball bearings 20 made of a dielectric or insulating material like the bearings 13 engage the skirt 14 and the annular flange 15 at the juncture thereof in order to stabilize the platform 11 with respect to the base 12.

The skirt 14 of the rotating platform 11 is divided into two sections 14A and 14B which are welded together at seam 14C after the relatively wide structure 18 of the base 12 is inserted within the top section 14a of the rotating platform.

In order to rotatably drive the platform 11 a gear 23 is fixed rigidly thereto by an adhesive or the like and is meshed with a drive gear 24 rotated by a shaft 26 which is supported and retained in a bracket 25. The shaft 26 has a driven gear 27 on one end thereof which meshes with a worm gear 28 that is rotated by an electric motor 29. The electric motor 29 is connected via leads 30 to a circuit 31 which derives its power from an antenna 32 which has two loops 32a and 32B which project into a waveguide 33 formed by the lower annular flange 15 of the platform 11 and a radially projecting plate portion 12C forming part of the base 12.

In order for the turntable 10 to function properly within the environment of a microwave oven, it is necessary that the drive system be shielded from microwave radiation both by the rotating platform 11 and by the base 12. It is preferred that the structure of the rotating platform 11 and base 12 cooperate in some manner to form a waveguide to organize a portion of the microwave energy so that the energy may be picked up by the antennas 32A and 32B for the purpose of driving motor 29. To this end, the rotating platform 11 is made of an electrically conductive material such as steel, preferably stainless steel, and that the base 12 also be made of steel, preferably stainless steel. By using an electrically conductive material the drive system is shielded and the annular waveguide 33 is created.

As stated before, the base 12 forms a shielding enclosure which protects drive elements such as the motor 29 and circuit 31 from microwaves permeating the oven in which the turntable 10 is used. The base 12 includes a one-piece stamping which comprises a floor 12A, a neck 12b, the annular plate 12C, a cylindrical wall 12D and a curved-over flange 12E. The curved-over flange 12E defines a cavity with the cylindrical wall 12D which serves as a choke 35 which registers with the annular waveguide 33. A first cylindrical plate 38 is secured to the curved-over portion 12E to form a race for supporting the upper ball bearings 13 and for helping to support lower ball bearings 20. Disposed between the plate 38 and curved-over portion 12e is a second cylindrical plate 39 which cooperates with the bottom end of plate 38 to capture ball bearings 20 and to form an opening for the choke 35.

As food resting on the platform 11 is exposed to microwaves, it absorbs these microwaves and converts the microwave energy into heat. In order to prevent conduction of this heat to the motor 29 and electrical circuitry 31, the base 12 has a pair of plates 41 and 42 welded to the interior surface of the cylindrical wall 12D along flanges 41A and 42A. The plates 41 and 42 are in spaced relation to one another so as to create a heat transfer barrier 43 which may or may not be filled with an insulating material such as fiberglass or foam to prevent convective transfer of heat to the motor 29 and electronics 31. Furthermore, the plates 41 and 42 buttress the cylindrical wall 12d to keep the choke 35 in place under the load of food on the rotatable platform 11. The shaft 26 which transfers torque from the motor 29 to gear 23 via drive gear 24 rotates in a babbit bearing 47 which passes through the heat transfer barrier 43.

Referring now more specifically to the arrangement for energizing the motor 29 through the circuit 31, the antennas 32a and 32b are positioned within the waveguide 33 and separated by a reflector septum 50. The reflector septum is made preferably out of a high dielectric plastic such as titanium dioxide ceramic having a dielectric constant in the order of 100. However, the septum 50 may be made of metal. If the reflector septum 50 is made of metal then it must be spaced from the annular flange 21C in order to avoid arcing. The reflector septum 50 defines a standing wave pattern within the waveguide 33 so that there is a peak at the loops 32. Preferably, there is a quarter wavelength distance along the circumferential path between the loops 32A and 32B. In connecting the loops 32A and 32B, it is seen that one end of each loop is grounded on the annular plate 12C while the other end passes through a hole 51 and is connected to the electrical circuit 31.

In order to permit microwaves to enter the waveguide 33 and the choke 35, a seal 52 made of a microwave permeable material is disposed between the edge of flange 15 and the neck 12B of the base 12. Preferably, the seal is glued to the neck 12b and the edge of the flange 15 slides past the seal as the rotatable platform 11 turns. The purpose of the seal is to keep out debris and as much moisture as possible, while still letting in microwave power to turn the motor 29.

The choke 35 and waveguide 33 cooperate to create two kinds of wave propagation. The choke 35 is a quarter wavelength device which reflects energy back into the waveguide 33 and prevents it from entering within the turntable housing proper. In one propagation the energy enters waveguide 33 through the seal 52 and travels radially to the outside corner of the waveguide 33 whereupon it turns the corner and travels past the lower end of plate 39 and axially up into choke 35. Since both the waveguide 33 and choke 35 are annular in form and two kinds of propagation occur, there is always a circumferential component which travels around the annular waveguide 33. In essence, the fields within the choke 35 and waveguide 33 are superimposed upon one another and add algebraically. The antenna loops 33A and 33B are each positioned on a different radius of the turntable 10 and pick up both standing and traveling waves occurring in the waveguide 33. The design principle of the loop location and orientation is such that they are made to optimally extract the energy component residing in the circumferentially traveling waves of annular waveguide 33.

Figure 3:
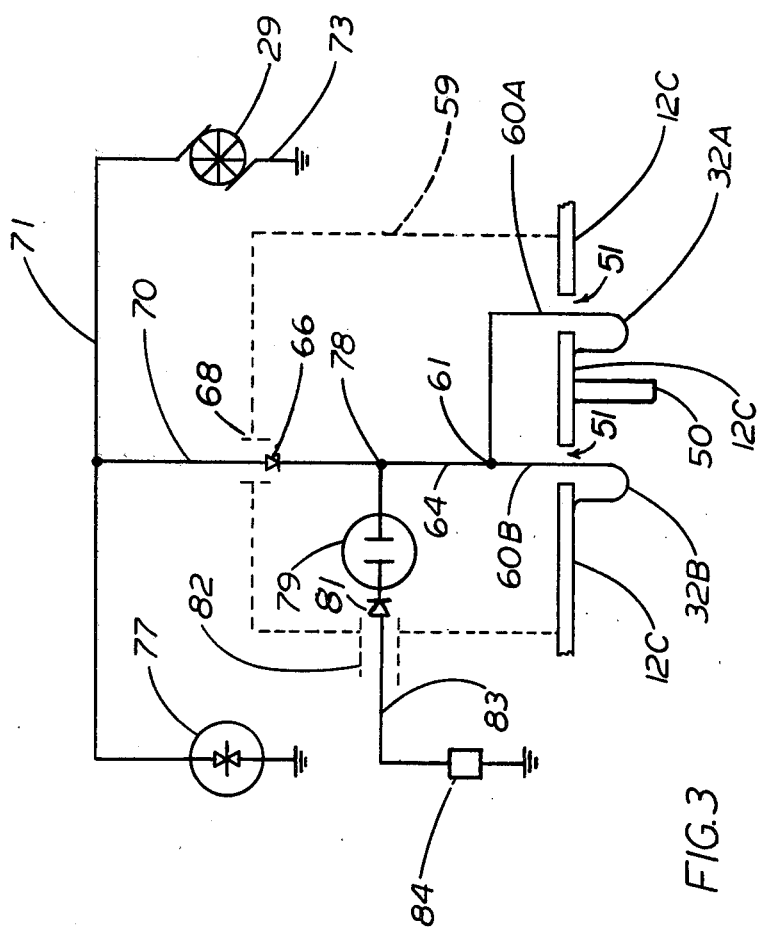
FIG. 3 is a circuit diagram showing the power circuit used to drive the turntable.

Referring now specifically to FIG. 3 where the electrical circuit 31 is shown contained in a grounded housing 59, power from the antenna loops 32A and 32B passes over leads 60A and 60B to a junction 61 within the circuit. The leads 60A and 60B are adjusted to have a length so that signals passing thereover arrive at the junction 61 in phase and are summed. The resultant summed signal passes over lead 65 to a Schottky-barrier diode 66. The diode 66 is preferably a gallium arsenide device which is typically used with impact oscillators, and in microwave circuit devices is used as either an amplifier or oscillator. The Schottky-barrier type diode 66 is capable of handling one hundred to two hundred miliwatts of power and therefore makes an extremely efficient microwave rectifier. A very small fraction, perhaps one percent of the power which is used to operate the oven, is diverted and used to run motor 29 after it is converted into DC power. A number of the diodes may be combined in a network to get, for example, three, four, five or ten watts depending on the size of the rotating platform 11 and the load thereon so as to drive a fairly high efficiency small motor 29. A suitable Schottky-barrier type diode 66 is obtainable from the Raytheon Corporation of Waltham, Mass., and is capable of up to forty watts in microwave power converted at an efficiency of nearly sixty to seventy percent. This type of diode can handle large amounts of power because its junction is heat-sinked in order to increase its power capacity. The power passing through diode 66 is taken out by a microwave, bypass/D.C., feed through capacitor 68 which passes through the wall of the grounded housing 59 and serves to block microwave power from traveling out through lead 70 from the diode 66. The capacitor 68 is needed because some microwave power is not rectified by the diode 66 and appears on the DC side of the diode. This power could perhaps damage the drive system of the turntable if allowed to leak into the cavity of the base 12 containing the motor 29 and gears 27 and 28. From the capacitor 68 current is taken over leads 70 and 71 to the motor 29 in order to turn the motor. The current is grounded via lead 73 after it passes through the motor 29. The current then returns back through the bottom of the loop where it is connected to the box.

In order to shunt the motor 29, a voltage clamp in the form of a metal oxide varistor 77 is utilized which is also attached to ground and operated in the manner of a Zener diode. The metal oxide varistor 77 serves as a voltage clamp to protect the motor 29 from voltage surges. For example, if the motor 29 is a three volt motor, a three volt metal oxide varistor 77 would be used so that if the voltage on the motor begins to exceed three volts, current would shunt through the varistor to ground. Accordingly, the varistor 77 serves as a voltage regulator.

A junction 78 is provided connecting a suitable gas discharge tube 79 such as a neon tube to the line 64. The tube 79 is attached on the unrectified side of the diode 66 to provide a short circuit so that when microwave voltage gets high enough, neon within the tube will break down. This provides a very effective short circuit with very little voltage drop or microwave leakage. Connected to the tube 79 there is another diode 81 which operates at a much lower power than diode 66 and which rectifies any microwave power which happens to leak past the tube 79. An additional microwave, bypass/D.C., feed through capacitor 82 is provided on the rectified side of diode 81 to absorb any microwave energy that might have happened to get past the diode 81. From the capacitor 82, the current is returned to ground over line 83 through a box 84 which contains signal equipment that is connected to ground.

In order to protect the circuit 31 further, a device which shunts microwave power is incorporated within the box 84 to shut down the entire oven if microwave power picked up by the antenna loops 32A and 32B is too high. The device associated with box 84 may emit a high frequency acoustical signal which is latched to a relay in the power cord for the oven so that when the acoustical signal is generated the power cord is opened to shut down the entire oven. A light or buzzer could be provided to indicate that the oven is shut down.

Figure 4:
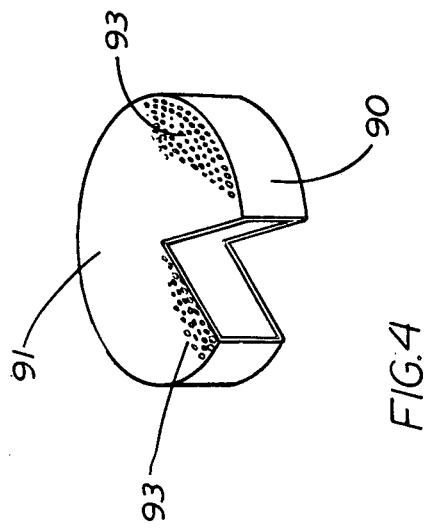
FIG. 4 is a perspective view of a cooking dish, known as a juicer, utilized with the turntable of the instant invention.

Referring now to FIG. 4, there is shown a drip or juice pan 90 which is used to support food being cooked in the oven. Essentially, the juice pan 90 is a dish with a perforated plate 91 on the top. The plate 91 has a plurality of holes 93 therein which are made of the same material that is used as viewing ports and for covering the windows and doors of microwave ovens to that microwave energy cannot slip through the top cover plate. This is usually accomplished by providing a plurality of holes in the plate sufficiently small and so arranged that microwave energy cannot pass or is reduced to a negligible value. Preferably, the plate 91 is made of metal or of some material that reflects microwave energy. The pan is made of metal so that, in combination with the cover plate, microwave energy is excluded from passing into the pan. Generally, food is placed on top of the plate 91 and juices flow through the holes 93 into the pan. In this way, microwave energy is not wasted in being used to further heat and evaporate these juices.

It should be pointed out that the foregoing is not trivial since the amount of heat required to evaporate these juices is quite considerable due to the transition factor in carrying the juice through the latent heat of evaporation. This is a peculiar advantage to the microwave cooking system since it is possible to isolate these juices from the cooking fields.

The foregoing embodiment is merely illustrative of the instant invention and the invention is limited only by the following appended claims.

What is claimed is:

1. Apparatus for moving articles in a microwave environment comprising:
    a platform for mounting articles;
    a base for mounting the platform;
    motor means within the base;
    transmission means, driven by the motor means and connected to the platform, for moving the platform relative to the base;
    power conversion means for converting microwave energy to energy usable by the motor means; and
    power modifying means for connecting the power conversion means to the motor means to power the motor means.

2. The apparatus of claim 1 wherein the power conversion means comprises:
    waveguide means formed on the apparatus for channeling microwave energy;
    choke means registered with the waveguide and cooperating with the waveguide for propagating a microwave pattern within the waveguide; and
    antenna means within the waveguide means for collecting energy from the microwave pattern in the waveguide and converting that energy into wire carried electric current.

3. The apparatus of claim 2 wherein the power conversion means is connected to the power modifying means, wherein the motor means is a DC electric motor, and wherein the power modifying means is an electrical circuit comprising:
    diode means for converting alternating currents collected by the antenna to direct current for driving the DC motor; and
    means for preventing microwave leakage by the electrical circuit.

4. The apparatus of claim 3 wherein the electrical circuit is contained within a housing and wherein the means for preventing microwave transmission by the electrical circuit includes a microwave, bypass/D.C. feed through capacitor disposed in the wall of the housing and between the diode means and D.C. motor.

5. The apparatus of claim 1 further comprising:
   means for restraining the platform to rotary motion with respect to the base.

6. The apparatus of claim 2 wherein the choke is annular and the base includes a circular portion for supporting the choke; and wherein the apparatus further includes:
   bearing means disposed outboard of the choke for supporting the platform for rotary motion with respect to the base; and
   circular flange means extending from the platform over the choke and beneath the circular portion of the base to form the waveguide between the flange means and circular portion of the base.

7. A turntable for rotating food in a microwave oven comprising:
   a platform for supporting the food;
   a base for supporting the platform;
   motor means within the base;
   transmission means, driven by the motor means and connected to the platform for moving the platform relative to the base;
   power conversion means for converting microwave energy within the oven to power usable by the motor means;
   power modifying means for connecting the power conversion means to the motor means to power the motor means.

8. The apparatus of claim 7 where the power conversion means comprises:
   waveguide means formed on the apparatus for channeling microwave energy;
   choke means registered with the waveguide and cooperating with the waveguide for propagating a microwave pattern within the waveguide; and
   antenna means within the waveguide means for collecting energy from the microwave pattern in the waveguide and converting that energy into wire carried electric current.

9. The apparatus of claim 8 wherein the power conversion means is connected to the power modifying means, wherein the motor means is a DC electric motor, and wherein the power modifying means is an electrical circuit comprising:
   diode means for converting alternating currents collected by the antenna to direct current for driving the DC motor; and
   means for preventing microwave transmission by the electrical circuit.

10. The apparatus of claim 9 wherein the electrical circuit is contained within a housing and wherein the means for preventing microwave leakage by the electrical circuit includes a microwave, bypass/D.C. feed through capacitor disposed in the wall of the housing and between the diode means and D.C. motor.

11. The apparatus of claim 8 wherein the choke is annular and the base includes a circular portion for supporting the choke; and wherein the apparatus further includes:
    bearing means disposed outboard of the choke for supporting the platform for rotary motion with respect to the base; and
    circular flange means extending from the platform over the choke and beneath the circular portion of the base to form the waveguide between the flange means and circular portion of the base.

12. The apparatus of claim 8 wherein the choke is annular and the base includes a circular portion for supporting the choke; and wherein the apparatus further includes:
    bearing means disposed outboard of the choke for supporting the platform for rotary motion with respect to the base;
    circular flange means extending from the platform over the choke and beneath the circular portion of the base to form the waveguide between the flange means and circular portion of the base; and
    partition means within the base for dividing the base into a first chamber containing the motor and electrical circuit and a second chamber which insulates thermally the first chamber from the platform to decrease heat transfer from food on the platform to the motor and circuit.

* * * * *